(12) United States Patent
Pritchard et al.

(10) Patent No.: US 11,524,566 B2
(45) Date of Patent: Dec. 13, 2022

(54) P3 HYBRID TRANSFER CASE

(71) Applicant: BorgWarner Inc., Auburn Hills, MI (US)

(72) Inventors: Larry A. Pritchard, Macomb, MI (US); Philip J. Francis, Lapeer, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/943,063

(22) Filed: Jul. 30, 2020

(65) Prior Publication Data

US 2021/0046816 A1 Feb. 18, 2021

Related U.S. Application Data

(60) Provisional application No. 62/887,796, filed on Aug. 16, 2019.

(51) Int. Cl.
| | |
|---|---|
| *B60K 6/52* | (2007.10) |
| *B60K 6/365* | (2007.10) |
| *F16H 37/06* | (2006.01) |
| *F16H 3/54* | (2006.01) |
| *F16H 3/097* | (2006.01) |

(Continued)

(52) U.S. Cl.
CPC ............... *B60K 6/52* (2013.01); *B60K 6/365* (2013.01); *B60K 6/387* (2013.01); *B60K 17/342* (2013.01); *B60K 17/356* (2013.01); *F16H 3/097* (2013.01); *F16H 3/54* (2013.01); *F16H 7/06* (2013.01); *F16H 37/065* (2013.01); *F16H 63/3425* (2013.01); *B60Y 2200/92* (2013.01); *B60Y 2400/82* (2013.01); *F16H 2200/0017* (2013.01);

(Continued)

(58) Field of Classification Search
CPC ... B60K 17/342; B60K 17/365; F16H 37/065; F16H 3/54; F16H 3/097; F16H 2200/2005; F16H 2200/2094; F16H 2200/0017; F16H 2200/2064
See application file for complete search history.

(56) References Cited

U.S. PATENT DOCUMENTS

| | | | | |
|---|---|---|---|---|
| 4,699,249 A | * | 10/1987 | Fujiura | ................ B60K 17/344 184/11.1 |
| 4,841,803 A | * | 6/1989 | Hamano | .............. B60K 17/344 180/247 |

(Continued)

*Primary Examiner* — Timothy Hannon
*Assistant Examiner* — Farhana Pervin
(74) *Attorney, Agent, or Firm* — Burris Law, PLLC (57) ABSTRACT

A transfer case having, a transmission mount, an input shaft received through the transmission mount, an electric propulsion motor, a transfer case portion and a transmission portion. The transfer case portion has a transfer case portion input, a first transfer case portion output, a second transfer case portion output, and a power transfer mechanism, the first transfer case portion output being drivingly coupled to the transfer case input portion, the power transfer mechanism drivingly coupling the second transfer case portion output to the first transfer case output portion. the transmission portion has a first coupling, which is selectively operable for drivingly connecting the input shaft to the transfer case portion input, and a second coupling that is selectively operable for drivingly connecting a rotor of the electric propulsion motor to the transfer case portion input.

1 Claim, 6 Drawing Sheets

(51) Int. Cl.
  *F16H 63/34* (2006.01)
  *F16H 7/06* (2006.01)
  *B60K 6/387* (2007.10)
  *B60K 17/342* (2006.01)
  *B60K 17/356* (2006.01)

(52) U.S. Cl.
  CPC .............. *F16H 2200/2005* (2013.01); *F16H 2200/2064* (2013.01); *F16H 2200/2094* (2013.01)

(56) References Cited

U.S. PATENT DOCUMENTS

| | | | |
|---|---|---|---|
| 4,896,561 A * | 1/1990 | Hayakawa | F16H 57/0421 184/6.12 |
| 6,464,608 B2 | 10/2002 | Bowen et al. | |
| 6,533,692 B1 | 3/2003 | Bowen | |
| 6,589,128 B2 | 7/2003 | Bowen | |
| 6,719,656 B2 | 4/2004 | Bowen | |
| 8,960,033 B2 * | 2/2015 | Kaltenbach | B60K 6/547 74/331 |
| 9,475,385 B1 * | 10/2016 | Pritchard | B60K 17/344 |
| 10,309,522 B2 * | 6/2019 | Palazzolo | B60K 17/348 |
| 2003/0104892 A1 | 6/2003 | Porter | |
| 2007/0000707 A1 | 1/2007 | Porter | |
| 2012/0077633 A1 | 3/2012 | Mueller | |
| 2015/0158383 A1 * | 6/2015 | Mastie | B60K 17/3467 475/204 |
| 2016/0167503 A1 * | 6/2016 | Lee | B60K 6/48 475/5 |
| 2017/0158052 A1 * | 6/2017 | Hamilton | B60K 23/08 |
| 2017/0232840 A1 * | 8/2017 | Pritchard | B60K 23/0808 74/665 GE |
| 2017/0234373 A1 * | 8/2017 | Palazzolo | B60K 17/344 192/84.6 |
| 2018/0170177 A1 * | 6/2018 | Yamamoto | B60K 17/344 |
| 2020/0325987 A1 * | 10/2020 | Nishimoto | B60K 17/08 |

\* cited by examiner

P3 HYBRID TRANSFER CASE

CROSS-REFERENCE TO RELATED APPLICATIONS

This application claims the benefit of U.S. Provisional Patent Application No. 62/887,796 filed Aug. 16, 2019, the disclosure of which is incorporated by reference as if fully set forth in detail herein.

FIELD

The present disclosure relates to a P3 hybrid transfer case.

BACKGROUND

There is increasing interest in the part of vehicle OEM's and consumers in hybrid vehicles having advanced traction capabilities, such as all-wheel drive or four-wheel drive capabilities. One common approach is to incorporate an electrically driven axle into the vehicle drivetrain so that one set of vehicle wheels is driven by a powertrain having a conventional internal combustion engine as its source of rotary power, while the other set of vehicle wheels is driven by an electric motor (i.e., a P4 hybrid configuration). One disadvantage of this approach is that both the internal combustion engine and the electric motor must be operated to drive both sets of vehicle wheels.

Another approach couples an electric motor to the transmission of the powertrain of the vehicle (i.e., a P3 hybrid configuration), which permits the transmission to be powered by an internal combustion engine and/or the electric motor. Rotary power output from the transmission is employed to drive a conventional all-wheel drive driveline or a conventional four-wheel drive driveline. One drawback of this approach is that it is frequently difficult to incorporate the electric motor into the transmission due to the lack of space that is typically available in a modern automotive vehicle. Further, the vehicle OEM will need to manufacture two versions of the transmission (i.e., a non-hybrid version and a hybrid version) if the vehicle is to be offered for sale in both a conventional non-hybrid configuration and a hybrid electric configuration.

SUMMARY

This section provides a general summary of the disclosure, and is not a comprehensive disclosure of its full scope or all of its features.

In one form, the present disclosure provides a transfer case having, a transmission mount, an input shaft received through the transmission mount, an electric propulsion motor, a transfer case portion and a transmission portion. The transfer case portion has a transfer case portion input, a first transfer case portion output, a second transfer case portion output, and a power transfer mechanism, the first transfer case portion output being drivingly coupled to the transfer case input portion, the power transfer mechanism drivingly coupling the second transfer case portion output to the first transfer case output portion. the transmission portion has a first coupling, which is selectively operable for drivingly connecting the input shaft to the transfer case portion input, and a second coupling that is selectively operable for drivingly connecting a rotor of the electric propulsion motor to the transfer case portion input.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
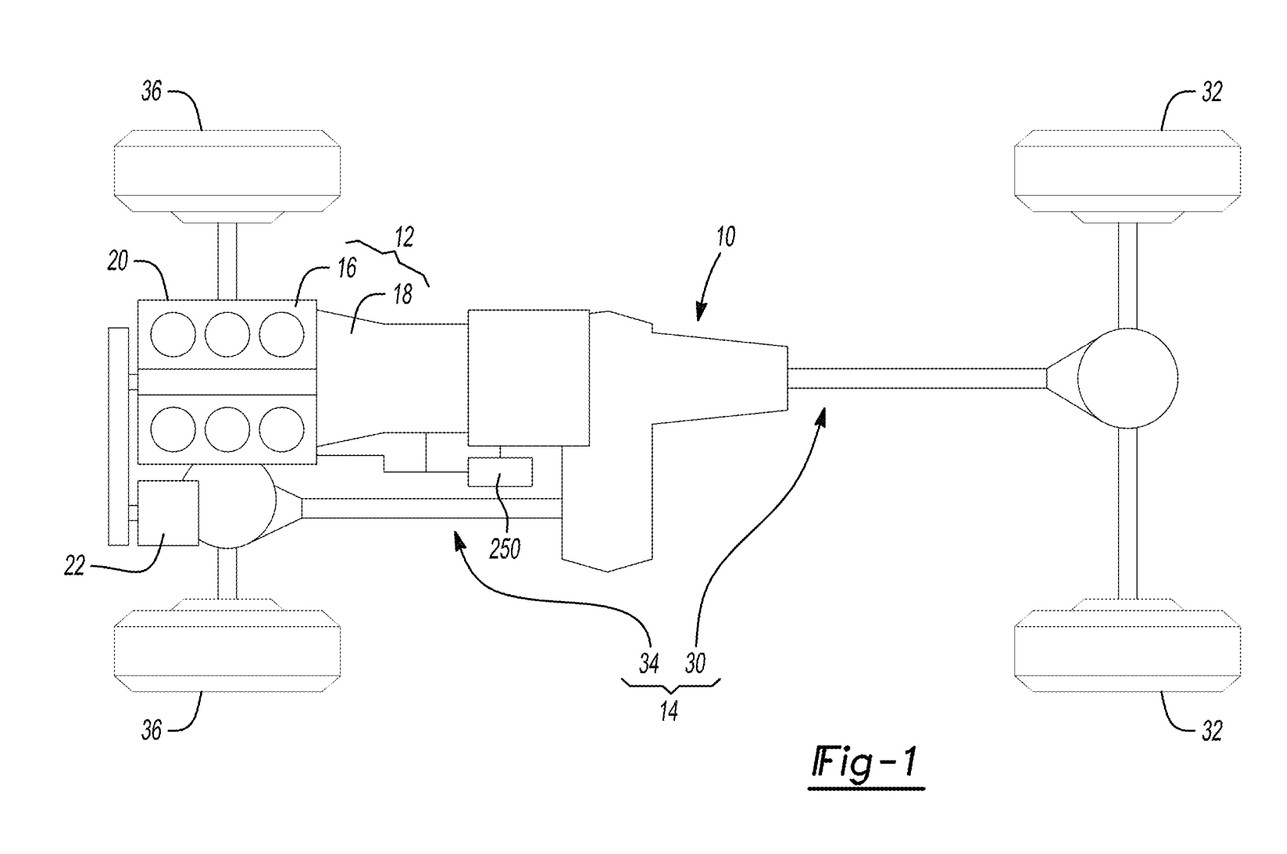
FIG. 1 is a schematic illustration of a representative vehicle having an exemplary P3 hybrid transfer case constructed in accordance with the teachings of the present disclosure.

With reference to FIG. 1, an exemplary P3 transfer case constructed in accordance with the teachings of the present disclosure is generally indicated by reference numeral 10. The P3 transfer case 10 is shown in a vehicle environment in operative association with a vehicle power train 12 and a vehicle drive train 14. The vehicle power train 12 includes a power source 16 and a transmission 18 that can selectively provide rotary power to the P3 transfer case 10. The power source 16 can comprise an internal combustion engine 20 and can optionally include a belt-driven starter-generator 22. Rotary power produced by the power source 16 can be transmitted to the transmission 18, which can be configured in a conventional and well-known manner.

The vehicle drive train 14 includes a first driveline 30, which is configured to transmit rotary power to a first pair of vehicle wheels 32, and a second driveline 34 that is configured to transmit rotary power to a second pair of vehicle wheels 36. In the example provided, the first driveline 30 is a rear driveline of the vehicle and the second driveline 34 is a front driveline of the vehicle. It will be appreciated, however, that the first driveline 30 could be the front driveline of the vehicle and that the second driveline 34 could be the rear driveline of the vehicle.

The P3 transfer case 10 is configured to transmit rotary power to the first and second drivelines 30 and 34. The rotary power transmitted to the first driveline 30 and/or the second driveline 34 could be provided by the vehicle power train 12 and/or by an electric motor (not specifically shown) in the P3 transfer case 10.

Figure 2:
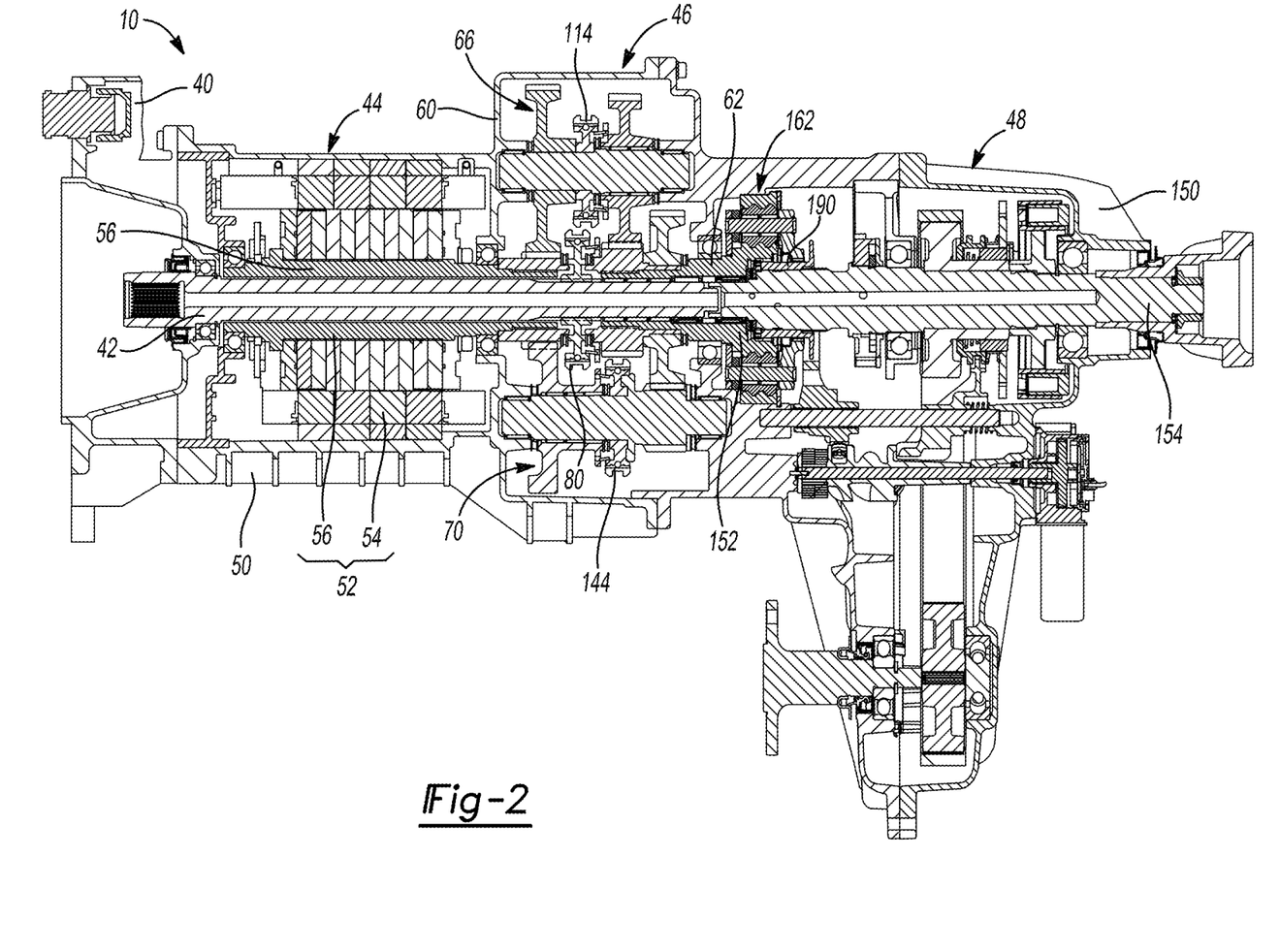
FIG. 2 is a longitudinal cross-sectional view of the P3 hybrid transfer case of FIG. 1.

With reference to FIG. 2, the P3 transfer case 10 can include a transmission mount 40, an input shaft 42, a propulsion motor portion 44, a transmission portion 46, and a transfer case portion 48. The transmission mount 40 is configured to be mounted to the transmission 18 (FIG. 1) of the vehicle power train 12 (FIG. 1). The transmission mount 40 can at least partly support the input shaft 42 for rotation about its longitudinal axis. The input shaft 42 is configured to be non-rotatably but axially slidably engaged to the output shaft (not shown) of the transmission 18 (FIG. 1).

The propulsion motor portion 44 can comprise a motor housing 50 and an electric motor 52 that is received in the motor housing 50. The motor housing 50 is fixedly coupled to the transmission mount 40. The electric motor 52 can be any type of electric motor, such as a permanent magnet motor or an induction motor, or could comprise two or more types of electric motors. In the example provided, the electric motor 52 is an induction motor and has a stator 54 and a rotor 56 that is disposed concentrically within the stator 54. The input shaft 42 is received coaxially through the rotor 56.

Figure 3:
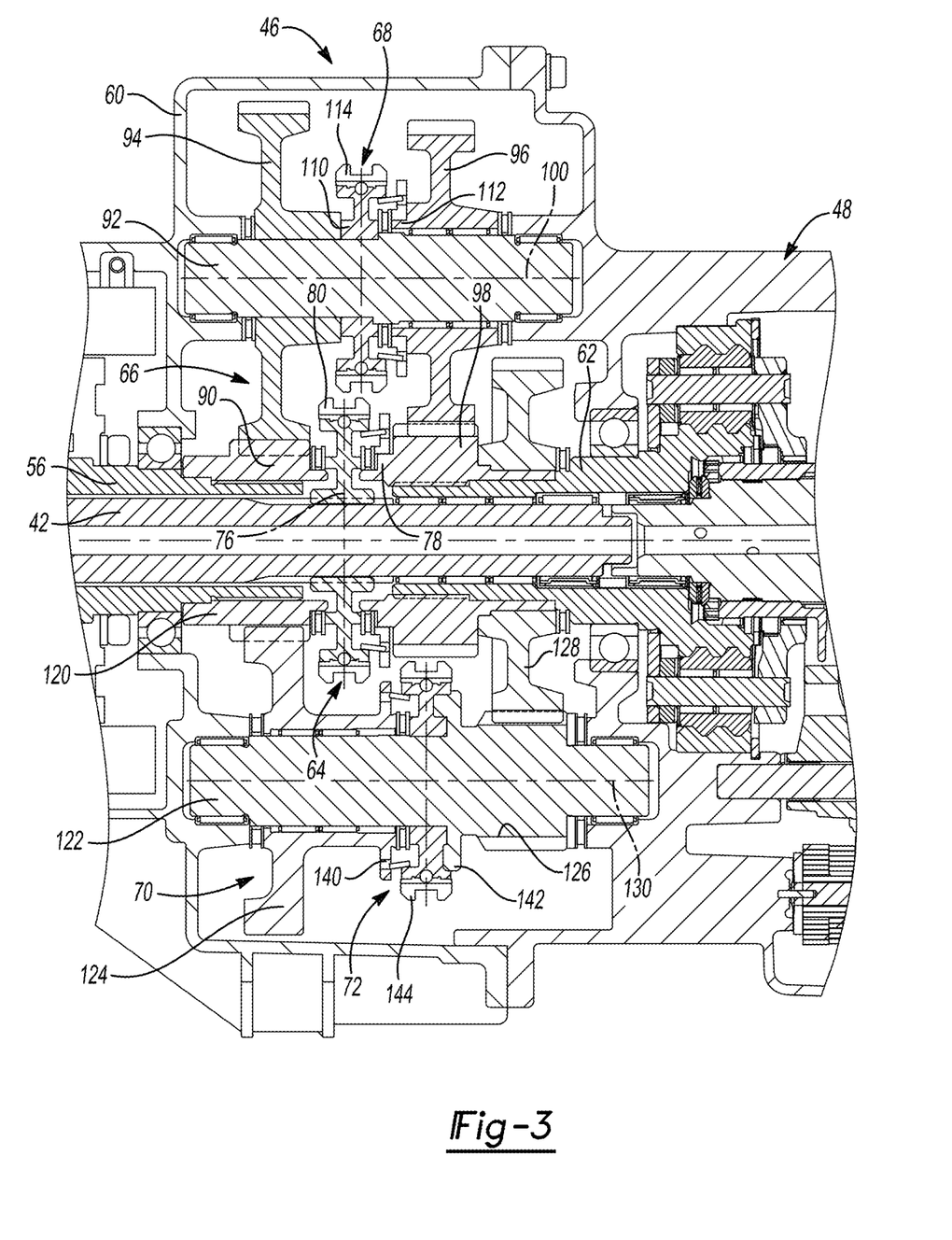
FIGS. 3 and 4 are enlarged portions of FIG. 2 illustrating a transmission portion and a transfer case portion, respectively, of the P3 hybrid transfer case.

With reference to FIG. 3, the transmission portion 46 is configured to control the transmission of rotary power into the transfer case portion 48 and has transmission portion housing 60 and a transmission portion output 62. The transmission portion 46 can include one or more couplings or a clutches that selectively inhibit the transmission of rotary power between the input shaft 42 and the transmission portion output 62 and/or that selectively inhibit the transmission of rotary power between the rotor 56 and the transmission portion output 62. Optionally, the transmission portion 46 can include one or more reduction gearsets that are configured to provide a speed reduction and torque multiplication function between the rotor 56 and the transmission portion output 62. In the example provided, the transmission portion 46 includes a first coupling 64, a first reduction gearset 66, a second coupling 68, a second reduction gearset 70 and a third coupling 72.

The first coupling 64 can be any type of coupling or clutch that is configured to selectively couple the input shaft 42 to the transmission portion output 62. As shown, the first coupling 64 comprises a (half) synchronizer that can include a first synchronizer portion 76, which is coupled to the input shaft 42 for rotation therewith, a second synchronizer portion 78, which can be coupled to the transmission portion output 62 for rotation therewith, and a first synchronizer collar 80 that is movable between a first position, in which the first synchronizer collar 80 is engaged to one of the first and second synchronizer portions 76 and 78 and disengaged from the other one of the first and second synchronizer portions 76 and 78, and a second position in which the first synchronizer collar 80 is engaged to both of the first and second synchronizer portions 76 and 78. It will be appreciated that rotary power is not transmitted from the input shaft 42 to the transmission portion output 62 when the first synchronizer collar 80 is disposed in the first position, but that rotary power is transmitted from the input shaft 42 to the transmission portion output 62 when the first synchronizer collar 80 is disposed in the second position.

The first reduction gearset 66 comprises a first reduction gear 90, which is directly driven by the rotor 56, a first layshaft 92, a second reduction gear 94, a third reduction gear 96 and a fourth reduction gear 98. The first layshaft 92 is rotatably mounted in the transmission portion housing 60, extends along a first layshaft axis 100 that is parallel to the longitudinal axis of the input shaft 42, and is coupled to the second reduction gear 94 for common rotation. The second reduction gear 94 is meshingly engaged with (i.e., driven by) the first reduction gear 90. The third reduction gear 96 is rotatably disposed on the first layshaft 92 and is rotatable relative to the second reduction gear 94. The fourth reduction gear 98 is non-rotatably coupled to the transmission portion output 62 and is meshingly engaged with the third reduction gear 96.

The second coupling 68 can be any type of coupling or clutch that is configured to selectively couple the third reduction gear 96 to the second reduction gear 94. As shown, the second coupling 68 comprises a (half) synchronizer that can include a third synchronizer portion 110, which is coupled to the second reduction gear 94 for rotation therewith, a fourth synchronizer portion 112, which can be coupled to the third reduction gear 96 for rotation therewith, and a second synchronizer collar 114 that is movable between a first position, in which the second synchronizer collar 114 is engaged to one of the third and fourth synchronizer portions 110 and 112 and disengaged from the other one of the third and fourth synchronizer portions 110 and 112, and a second position in which the second synchronizer collar 114 is engaged to both of the third and fourth synchronizer portions 110 and 112. It will be appreciated that rotary power is not transmitted between the second and third reduction gears 94 and 96 when the second synchronizer collar 114 is disposed in the first position, but that rotary power is transmitted between the second and third reduction gears 94 and 96 when the second synchronizer collar 114 is disposed in the second position.

The second reduction gearset 70 comprises a fifth reduction gear 120, which is directly driven by the rotor 56 and which could optionally be the first reduction gear 90, a second layshaft 122, a sixth reduction gear 124, a seventh reduction gear 126 and an eighth reduction gear 128. The second layshaft 122 is rotatably mounted in the transmission portion housing 60, extends along a second layshaft axis 130 that is parallel to the longitudinal axis of the input shaft 42 and the first layshaft axis 100, and is coupled to the sixth reduction gear 124 for common rotation. The sixth reduction gear 124 is meshingly engaged with (i.e., driven by) the fifth reduction gear 120. The seventh reduction gear 126 is rotatably disposed on the second layshaft 122 and is rotatable relative to the sixth reduction gear 124. The eighth reduction gear 128 is non-rotatably coupled to the transmission portion output 62 and is meshingly engaged with the seventh reduction gear 126.

The third coupling 72 can be any type of coupling or clutch that is configured to selectively couple the seventh reduction gear 126 to the sixth reduction gear 124. As shown, the third coupling 72 comprises a (half) synchronizer that can include a fifth synchronizer portion 140, which is coupled to the sixth reduction gear 124 for rotation therewith, a sixth synchronizer portion 142, which can be coupled to the seventh reduction gear 126 for rotation therewith, and a third synchronizer collar 144 that is movable between a first position, in which the third synchronizer collar 144 is engaged to one of the fifth and sixth synchronizer portions 140 and 142 and disengaged from the other one of the fifth and sixth synchronizer portions 140 and 142, and a second position in which the third synchronizer collar 144 is engaged to both of the fifth and sixth synchronizer portions 140 and 142. It will be appreciated that rotary power is not transmitted between the sixth and seventh reduction gears 124 and 126 when the third synchronizer collar 144 is disposed in the first position, but that rotary power is transmitted between the sixth and seventh reduction gears 124 and 126 when the third synchronizer collar 144 is disposed in the second position.

The first, second and third synchronizer collars 80, 114 and 144 can be moved in various different ways. For example, the second and third synchronizer collars 114 and 144 can be mounted to a common rail (not shown) and one actuator or linear motor could be employed to translate the first synchronizer collar 80 and a second actuator or linear motor could be employed to translate the common rail (to thereby translate the second and third synchronizer collars 114 and 144). In the example provided, the second and third couplings 68 and 72 are configured so that movement of a shift rail in a first axial direction would tend to drive one of the second and third shift collars 114 and 144 toward its first position and the other one of the second and third shift collars 114 and 144 toward its second position, while movement of the shift rail in a second, opposite axial direction would tend to drive the one of the second and third synchronizer collars 114 and 144 toward its second position and the other one of the second and third shift collars 114 and 144 toward its first position.

Figure 4:
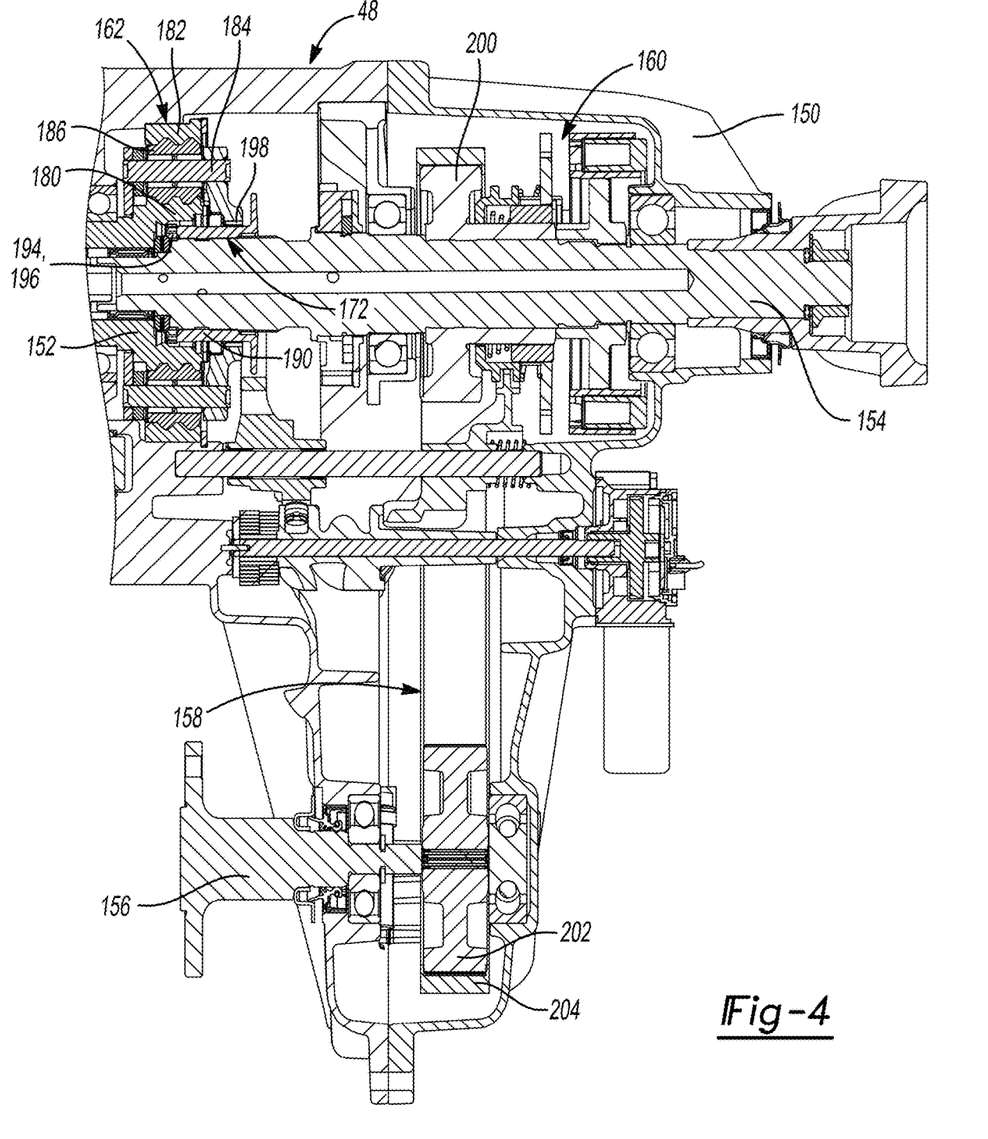

With reference to FIG. 4, the transfer case portion 48 includes a transfer case portion housing 150, a transfer case portion input 152, a first transfer case portion output 154, a second transfer case portion output 156 and a power transfer mechanism 158. The transfer case portion 48 can be configured in any desired manner, such as to provide full-time four wheel drive in which the first and second transfer case portion outputs 154 and 156 are driven continuously, or to provide a type of selective or automatic four-wheel drive that interrupts the transmission of rotary power to one of the first and second transfer case portion outputs 154 and 156. In the example provided, the transfer case portion 48 drives the first transfer case portion output 154 on a full time basis and further includes a mode clutch 160, which permits selective torque transmission to the second transfer case portion output 156, and an optional multi-speed transmission assembly 162.

The transfer case portion housing 150 is fixedly coupled to the transmission portion housing 60 (FIG. 2) and supports the transfer case portion input 152 and the first transfer case portion output 154 for rotation about respective axes that are coincident with the longitudinal axis of the input shaft 42 (FIG. 2). The multi-speed transmission assembly 162 includes a two-speed, single stage planetary gearset and a range clutch 172. The planetary gearset comprises a sun gear 180, which is rotatably coupled to (e.g., unitarily and integrally formed with) the transfer case portion input 152, a ring gear 182, which is non-rotatably coupled to the transfer case portion housing 150, a planet carrier 184 and a plurality of planet gears 186 that are journally supported by the planet carrier 184 and meshingly engaged with the sun gear 180 and the ring gear 182. The range clutch 172 includes a clutch sleeve 190, which is non-rotatably but axially slidably coupled to the first transfer case portion output 154, and a set of external clutch teeth 194 that are disposed about the circumference of the clutch sleeve 190. The clutch sleeve 190 is movable between a high-range position, in which the external clutch teeth 194 are engaged with a first set of internal clutch teeth 196 formed in the sun gear 180 and axially spaced apart from a second set of internal clutch teeth 198 formed in the planet carrier 184, and a low-range position in which the external clutch teeth 194 are engaged with the second set of internal clutch teeth 198 and spaced apart from the first set of internal clutch teeth 196.

The second transfer case portion output 156 is supported by the transfer case portion housing 150 for rotation about an axis that is parallel to but offset from the longitudinal axis of the input shaft 42. The power transfer mechanism 158 is configured to transmit rotary power between the first transfer case portion output 154 and the second transfer case portion output 156. In the example provided, the power transfer mechanism 158 includes a first sprocket 200, a second sprocket 202, which is non-rotatably coupled to the second transfer case portion output 156, a loop of chain 204, which is disposed about and drivingly engaged with the first and second sprockets 200 and 202. The mode clutch 160 is configured to selectively rotationally couple the first sprocket 200 to the first transfer case portion output 154.

Returning to FIGS. 1 and 2, it will be appreciated that the vehicle can be operated in various different modes. For example, the vehicle can be operated in modes in which rotary power is provided by the power train 12 to the P3 transfer case 10. The multi-speed transmission assembly 162 of the transfer case portion 48 can be operated with the clutch sleeve 190 in the high-range position, for example for operation of the vehicle in a high-range, two-wheel drive mode or a high-range, four-wheel drive mode, or with the clutch sleeve 190 in the low-range position for operation of the vehicle in a low-range, four-wheel drive mode.

Alternatively, the first synchronizer collar 80 of the transmission portion 46 of the P3 transfer case 10 can be disposed in its first position, which decouples the power train 12 from the transfer case portion input 152, and the electric motor 52 of the propulsion motor portion 44 can be operated to provide rotary power to the transmission portion 46 that is in turn transmitted to the transfer case portion 48. In this electrically powered operational mode, the transmission portion 46 and the multi-speed transmission assembly 162 can each be operated to provide a desired overall gear reduction. In this regard, the second synchronizer collar 114 can be disposed in its second position, which permits rotary power to be transmitted from the rotor 56 of the electric motor 52 through the first reduction gearset 66 (i.e., at a first reduction ratio) to the transmission portion output 62, while the third synchronizer collar 144 is disposed in its first position. Rotary power is transmitted from the transmission portion output 62 to the transfer case portion input 152 and the multi-speed transmission assembly 162 of the transfer case portion 48 can be operated with the clutch sleeve 190 in the high-range position or with the clutch sleeve 190 in the low-range position as desired. Alternatively, the third synchronizer collar 144 can be disposed in its second position, which permits rotary power to be transmitted from the rotor 56 of the electric motor 52 through the second reduction gearset 70 (i.e., at a second reduction ratio that is different from the first reduction ratio) to the transmission portion output 62, while the second synchronizer collar 114 is disposed in its first position. Rotary power is transmitted from the transmission portion output 62 to the transfer case portion input 152 and the multi-speed transmission assembly 162 of the transfer case portion 48 can be operated with the clutch sleeve 190 in the high-range position or with the clutch sleeve 190 in the low-range position as desired.

As another alternative, the first synchronizer collar 80 of the transmission portion 46 of the P3 transfer case 10 can be disposed in its second position, which couples the power train 12 from the transfer case portion input 152, and the electric motor 52 of the propulsion motor portion 44 can be operated to provide rotary power to the transmission portion 46 that is in turn transmitted to the transfer case portion 48. It will be appreciated that in this hybrid mode of operation that rotational energy is provided to the transfer case portion input 152 by both the power train 12 and the electric motor 52 of the P3 transfer case 10. It will be further appreciated that the transmission portion 46 and the multi-speed transmission assembly 162 can be each be operated (in the manner that is described above) to provide a desired overall gear reduction while the P3 transfer case 10 is operated in the hybrid mode.

Figure 5:
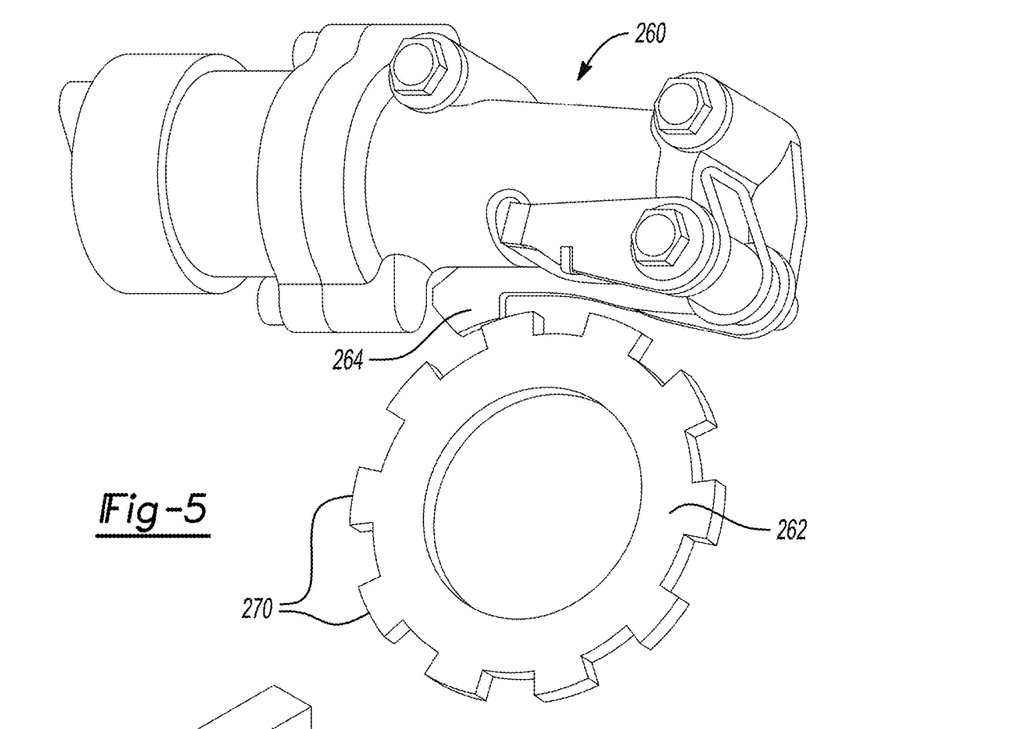
FIG. 5 is a perspective view of a portion of the P3 hybrid transfer case of FIG. 1, the view illustrating an exemplary park brake.

As yet another alternative, the first synchronizer collar 80 of the transmission portion 46 of the P3 transfer case 10 can be disposed in its second position, which couples the power train 12 from the transfer case portion input 152, the electric motor 52 of the propulsion motor portion 44 can be operated to provide rotary power to the transmission portion output 62 and the transfer case portion input 152 and the clutch sleeve 190 can be disposed in a neutral position between the high-range and low-range positions so that rotary power is not transmitted through the multi-speed transmission assembly 162 to the first transmission portion output 62. In this mode, the one of the second and third synchronizer collars 114 and 144 can be disposed in its second position to thereby couple the transmission portion output 62 to the rotor 56 through an associated one of the first and second reduction gearsets 66 and 70. Configuration in this manner permits the electric motor 52 to be driven by the power train 12 and operated as a generator. Optionally, it may be desirable in some situations to include a remote idle speed controller 250 to monitor the operation of the electric motor 52 (when it operates as a generator) and to control the rotational speed of the input shaft 42. In some embodiments, an electronic park brake 260 (FIG. 5) is incorporated into the vehicle at a desired location, such as in the transfer case portion 48, to lock the vehicle against movement. In this example, the electronic park brake 260 (FIG. 5) includes a brake disk 262 (FIG. 5), which can be non-rotatably coupled to the first transfer case portion output 154, and an electronically operated park pawl 264 (FIG. 5) that can be mounted to the transfer case portion housing 150. The brake disk 262 (FIG. 5) can include a plurality of circumferentially spaced-apart lugs 270 (FIG. 5). The park pawl 264 (FIG. 5) can be selectively translated between an adjacent pair of the lugs 270 (FIG. 5) and contact between the park pawl 264 (FIG. 5) and one of the lugs 270 (FIG. 5) will limit rotation of the first transfer case portion output 154.

Figure 6:
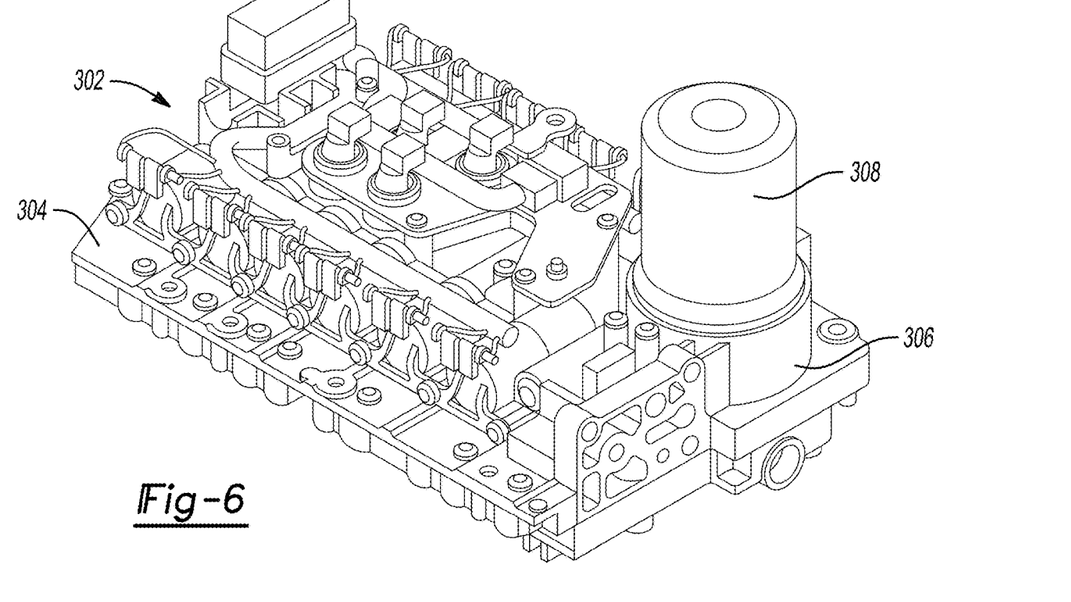
FIG. 6 is a perspective view of a portion of the P3 hybrid transfer case of FIG. 1, the view illustrating an integrated module for providing pressurized fluid and controlling the flow of pressurized fluid in the P3 hybrid transfer case for actuating, lubricating and cooling various components of the P3 hybrid transfer case.
Figure 7:
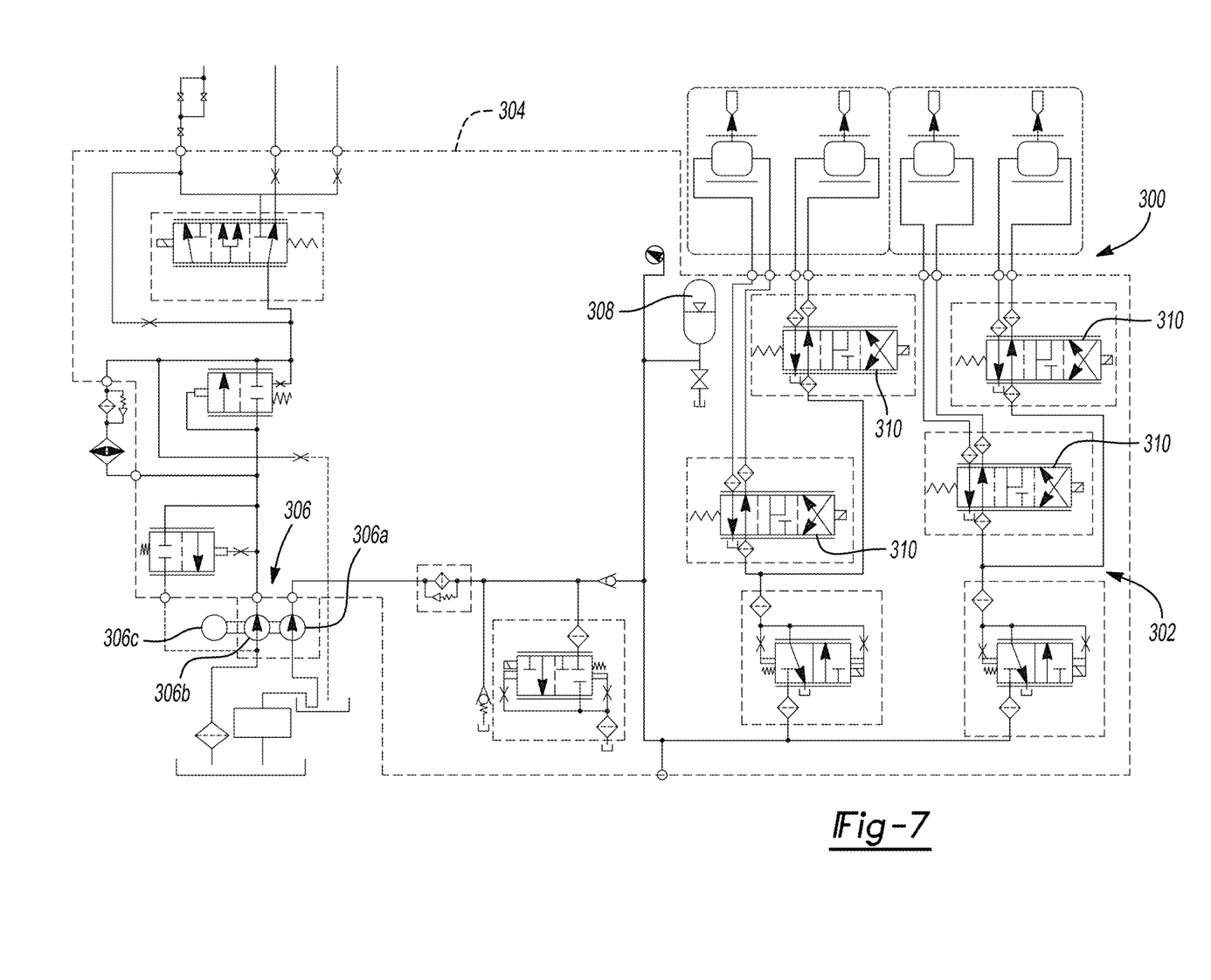
FIG. 7 is a schematic illustration of a hydraulic circuit in the P3 hybrid transfer case for providing pressurized fluid and controlling the flow of pressurized fluid in the P3 hybrid transfer case for actuating, lubricating and cooling various components of the P3 hybrid transfer case.

It will be appreciated that the P3 transfer case 10 can have various requirements for the movement of various components (e.g., the first, second and third synchronizer collars 80, 114 and 144, and the clutch sleeve 190), for lubrication of various components, and for cooling of various components. With reference to FIGS. 6 and 7, the actuation, lubrication and cooling functions are accomplished in the example provided through a hydraulic circuit 300 that includes an integrated module 302 having a manifold 304, at least one pump 306, an accumulator 308 and a plurality of electronically controlled valves 310. The manifold 304 comprises various mounts (not specifically shown) for each pump, the accumulator and each of the electronically controlled valves, as well as any needed fluid conduits to connect a fluid reservoir (not shown), the at least one pump 306, the accumulator 308 and/or one or more of the electronically controlled valves 310 to one another. In the particular example provided, the at least one pump 306 has a first pump 306a, which is configured to supply high pressure fluid at a relatively low flow rate, a second pump 306b, which is configured to supply lower pressure fluid at a relatively higher flow rate, and an electric motor 306c that is configured to drive both of the first and second pumps 306a and 306b. The higher pressure fluid provided by the first pump 306a can be employed to operate various hydraulic actuators (not shown) to selectively move the first, second and third synchronizer collars 80, 114 and 144 (FIG. 2), and the clutch sleeve 190 (FIG. 2), while the lower pressure fluid provided by the second pump 306b can be employed to lubricate various components of the P3 transfer case 10 (FIG. 2) and to cool desired components, such as the electric motor 52 (FIG. 2), as well as to operate various electronically controlled valves 310 that control the flow of lubricating and/or cooling fluid to the various components of the P3 transfer case 10 (FIG. 2).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transfer case comprising:
a housing assembly;
an electric motor received in the housing assembly, the electric motor having a stator and a rotor that is rotatable about a first rotary axis;
an input shaft received through the electric motor concentrically within the rotor, the input shaft being rotatable about the first rotary axis relative to the rotor;
a first gear coupled to the rotor for rotation therewith about the first rotary axis, the first gear being disposed concentrically about the input shaft;
a first layshaft mounted to the housing assembly for rotation about a first layshaft axis that is parallel to and offset from the first rotary axis;
a second gear meshingly engaged with the first gear and non-rotatably coupled to the first layshaft;
a third gear that is rotatable about the first layshaft;
a fourth gear that is meshingly engaged with the third gear and rotatable about the first rotary axis, the fourth gear being disposed concentrically about the input shaft;
a second layshaft that is mounted to the housing assembly for rotation about a second layshaft axis that is parallel to and offset from the first rotary axis and the first layshaft axis;
a fifth gear that is meshingly engaged with the first gear and rotatably disposed on the second layshaft;
a sixth gear that is coupled to the second layshaft for rotation therewith;
a seventh gear that is meshingly engaged with the sixth gear and rotatable about the first rotary axis, the seventh gear being disposed concentrically about the input shaft and being rotatably coupled to the fourth gear;
a first half-synchronizer having a first synchronizer portion, which is coupled to the input shaft for rotation therewith, and a second synchronizer portion that is coupled to the fourth gear for rotation therewith, the first half-synchronizer being selectively operable for coupling the fourth gear to the first gear for rotation therewith;
a second half-synchronizer having a third synchronizer portion, which is coupled to the second gear for rotation therewith, and a fourth synchronizer portion that is coupled to the third gear for rotation therewith, the second half-synchronizer being selectively operable for coupling the third gear to the second gear for rotation therewith;

a third half-synchronizer having a fifth synchronizer portion, which is coupled to the fifth gear for rotation therewith, and a sixth synchronizer portion that is coupled to the sixth gear for rotation therewith, the third half-synchronizer being selectively operable for coupling the sixth gear to the fifth gear for rotation therewith;

a transmission output member disposed concentrically about the input shaft and directly non-rotatably coupled to the fourth gear, the transmission output member being rotatable about the first rotary axis; a sun gear directly coupled to the transmission output member for rotation therewith;

a planet carrier disposed concentrically about the sun gear;

a ring gear that is disposed concentrically about the first rotary axis, the ring gear being non-rotatably coupled to the housing assembly;

a plurality of planet gears, each of the planet gears being journally supported by the planet carrier and meshingly engaged with the sun gear and the ring gear;

a rear output shaft that is rotatable about the first rotary axis and being received in the sun gear and the transmission output member;

a range collar that is mounted concentrically about the rear output shaft, the range collar being axially-slidably but non-rotationally coupled to the rear output shaft, the range collar being slidable along the first rotary axis between a first position, in which the range collar rotatably couples the planet carrier to the rear output shaft, and a second position in which the range collar rotatably couples the sun gear to the rear output shaft;

a first sprocket that is received on the rear output shaft, the first sprocket being rotatable relative to the rear output shaft;

a mode clutch that is selectively operable for coupling the first sprocket to the rear output shaft for rotation therewith;

a front output shaft that is rotatable about a second rotary axis that is parallel to and offset from the first rotary axis, the first layshaft axis and the second layshaft axis;

a second sprocket that is rotatably coupled to the front output shaft; and a chain that is disposed about the first and second sprockets.

* * * * *